Sept. 19, 1944. E. G. STAUDE Re. 22,547

ADHESIVE APPLYING AND REGISTERING MECHANISM

Original Filed Oct. 31, 1930 10 Sheets-Sheet 1

INVENTOR
EDWIN G. STAUDE
BY Vanel, Vanel & Moore
ATTORNEYS

Sept. 19, 1944. E. G. STAUDE Re. 22,547

ADHESIVE APPLYING AND REGISTERING MECHANISM

Original Filed Oct. 31, 1930 10 Sheets-Sheet 2

INVENTOR
EDWIN G. STAUDE
BY Paul, Paul & Moore
ATTORNEYS

Sept. 19, 1944. E. G. STAUDE Re. 22,547

ADHESIVE APPLYING AND REGISTERING MECHANISM

Original Filed Oct. 31, 1930 10 Sheets-Sheet 3

INVENTOR
EDWIN G. STAUDE
BY Paul, Paul & Moore
ATTORNEYS

ADHESIVE APPLYING AND REGISTERING MECHANISM

Original Filed Oct. 31, 1930 10 Sheets-Sheet 4

INVENTOR
EDWIN G. STAUDE
BY Paul, Paul & Woodard
ATTORNEYS

Sept. 19, 1944. E. G. STAUDE Re. 22,547

ADHESIVE APPLYING AND REGISTERING MECHANISM

Original Filed Oct. 31, 1930 10 Sheets-Sheet 5

INVENTOR
EDWIN G. STAUDE
BY Paul, Paul & Moore
ATTORNEYS

ADHESIVE APPLYING AND REGISTERING MECHANISM

Original Filed Oct. 31, 1930 10 Sheets-Sheet 6

INVENTOR
EDWIN G. STAUDE
BY Paul, Paul & Nelson
ATTORNEYS

Sept. 19, 1944. E. G. STAUDE Re. 22,547
ADHESIVE APPLYING AND REGISTERING MECHANISM
Original Filed Oct. 31, 1930 10 Sheets-Sheet 7
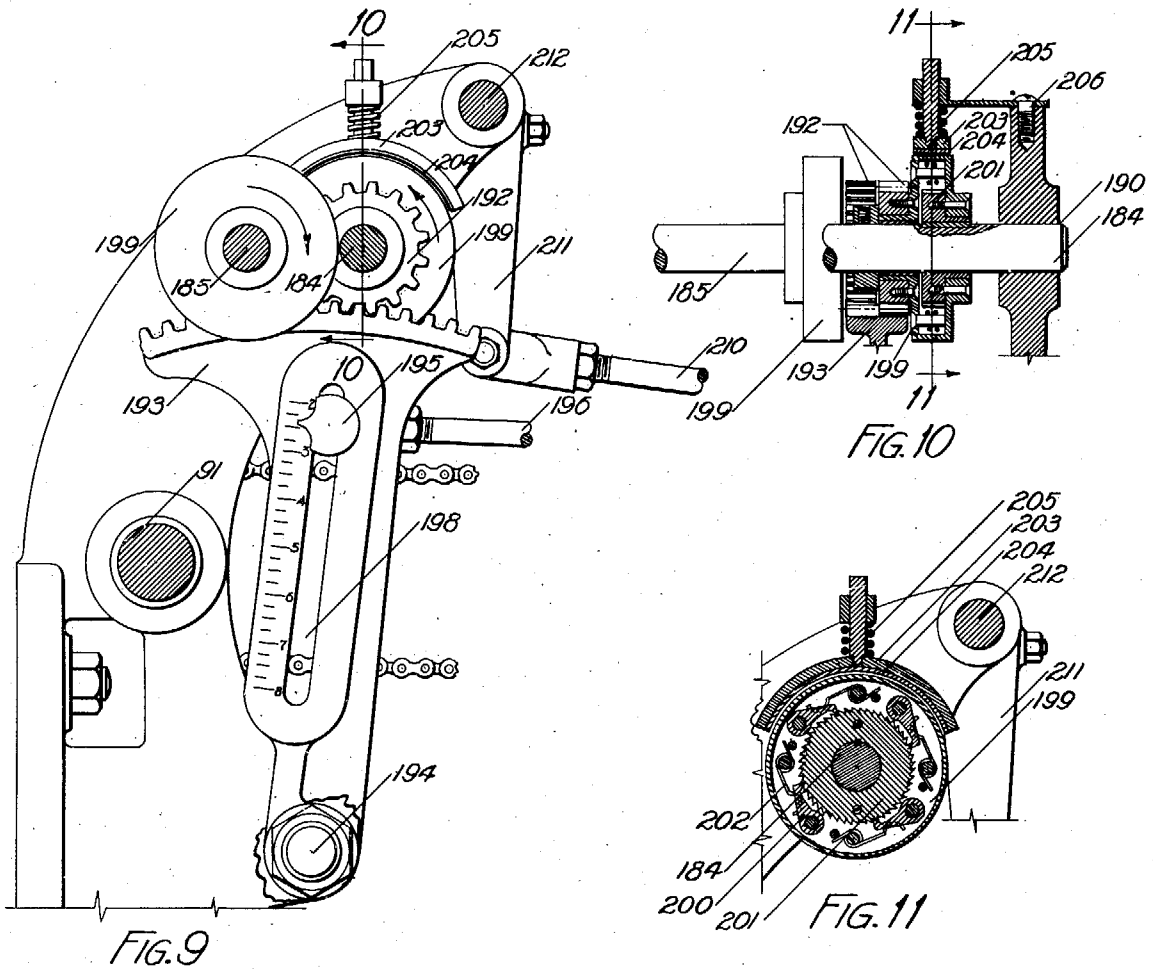
INVENTOR
EDWIN G STAUDE
BY Paul Paul Moore
ATTORNEYS Sept. 19, 1944. E. G. STAUDE Re. 22,547
ADHESIVE APPLYING AND REGISTERING MECHANISM
Original Filed Oct. 31, 1930 10 Sheets-Sheet 8
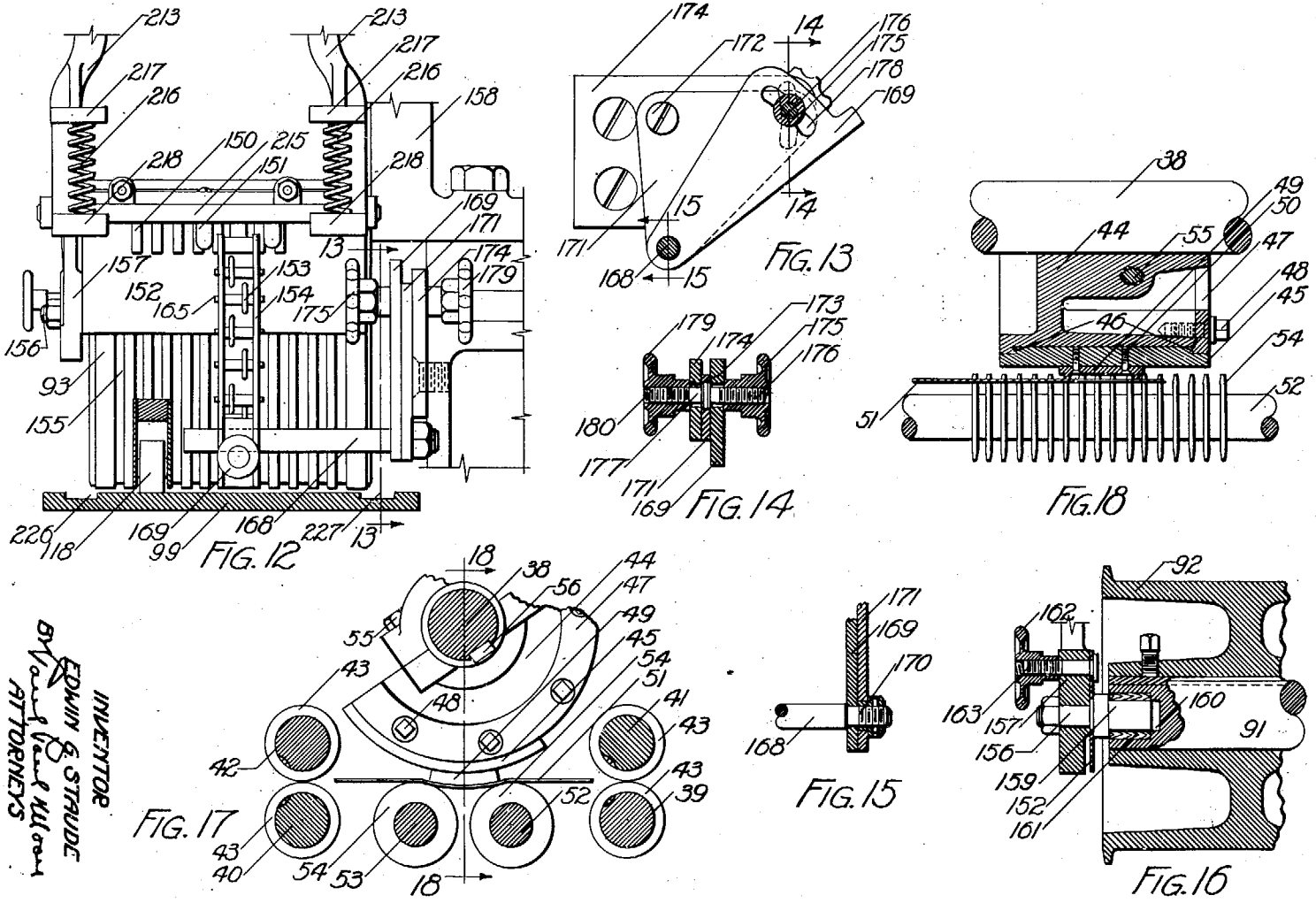
INVENTOR
EDWIN G. STAUDE
BY Paul Paul Allison
ATTORNEYS

ADHESIVE APPLYING AND REGISTERING MECHANISM

Original Filed Oct. 31, 1930 10 Sheets-Sheet 9

INVENTOR
EDWIN G. STAUDE
BY Varel, Varel & Moore
ATTORNEYS

ADHESIVE APPLYING AND REGISTERING MECHANISM

Original Filed Oct. 31, 1930 10 Sheets-Sheet 10

INVENTOR
EDWIN G. STAUDE
BY Paul, Paul & Moore
ATTORNEYS

Reissued Sept. 19, 1944

Re. 22,547

UNITED STATES PATENT OFFICE 22,547

ADHESIVE APPLYING AND REGISTERING MECHANISM

Edwin G. Staude, St. Paul, Minn., assignor to E. G. Staude Manufacturing Company, St. Paul, Minn., a corporation of Minnesota Original No. 1,969,106, dated August 7, 1934, Serial No. 492,441, October 31, 1930. Application for reissue June 17, 1944, Serial No. 540,791

44 Claims. (Cl. 93—36)

This invention relates to improvements in machines designed particularly for applying flexible sheets of paper or other suitable material, either glassine, Cellophane, transparent or opaque materials or labels to surfaces of various kinds, and more particularly to envelopes or box board blanks, or any other paper goods, or, in fact, to any material which can be fed.

A very important object of my invention is to provide an improved machine for automatically gluing windows in paper blanks such as are folded up into cartons; for gluing windows in envelopes, and in bags and the like, and also for applying lining sheets of paper material with precision register.

To accomplish the above, I provide among other features, means for holding thin transparent (or opaque) material, including thin cellulose, Cellophane, etc., substantially under a continuous tension before severing, and for thereafter immediately advancing the material to meet a blank to which it is to be glued, and for advancing it at a speed substantially equal to the advancing speed of the blank. By this means, I am always able to maintain control of the thin material, keep it smooth, and apply it in accurate register on the blank as it advances through the machine.

The present invention is designed to cover certain improvements and modifications in machines of the general type illustrated in my Patent Number 1,314,988, dated September 2, 1919. Among the principal objects of the present invention are: to provide means which can apply adhesive to a blank or surface exactly and only where required; to provide means whereby the area and configuration of application of the adhesive can be accurately controlled and varied; to provide means whereby "window-forming" material can be made to accurately register with the cut-out or window in a blank or envelope; to provide means for facilitating drying of the adhesive, to cause quick setting of the same; to provide a construction known as the "open side" feature, which gives the operator an unobstructed view of and access to all of the most important mechanisms; and to provide means whereby adherence of the material, or sticking thereof to the feeding means (due to production of frictional electricity or "static") is reduced to a minimum.

Other important objects are: to provide means for holding the blank in contact with the adhesive applying device, so that adjustment is not required for different thicknesses or sizes of stock within the range of the machine, with the arrangement such as will not permit adhesive to come in contact with the holding means when for any reason the adhesive-transferring platen is opposed to the holding means when no blank is in adhesive-receiving position; to provide belt means (as distinguished from cylinder means) for pressing the window, or other suitable material against the adhesive of the blank, to adhesively connect them, so that in case adhesive is deposited on said pressure means, the adhesive will not, because of the relatively large area of the pressing means in direction of feed, be likely to register or contact with material which subsequently comes in contact with it to soil the same; to provide a belt structure (in this instance by grooving in direction of feed) having a substantially reduced working-face area so that in case adhesive is accidentally applied thereto, it will be applied over relatively small areas, and will quickly dry, flake, and fall off, and therefore be less likely to adhere to material which is subsequently fed against it, this action being partly due to the flexibility of the belt which during travel over its roller supports, is "worked" in a manner to facilitate flaking or crumbling of any adhesive deposited thereon; to provide an air blast and/or equivalent means for holding the window-forming or other material in contact with the pressing belt or means and to use said air blast or other means to control and regulate the suction or pull of the material, before and after it has been cut.

A further object is to provide simple means adapted to further control the blank, which includes small adjustable trucks which may be quickly slipped into contact or removed, as required, depending upon the length of the blank to be fed into contact over the surface to which it is to be glued.

Another object of this invention is to provide a simple timed relationship throughout the machine from the feeder to the delivery end to insure the accurate predetermined position of the blank and material which is to be glued thereto at all times.

Features of the invention include all details of construction shown, along with the broader ideas of means disclosed in the present embodiment of the invention.

Objects, features and advantages of the invention will be set forth in the description of the drawings forming a part of this application, and in said drawings Figure 1 is a plan view of the machine embodying my invention, with the conveyor delivery partly broken away;

Figure 9 is a detail vertical sectional elevation on line 9—9 of Figure 8, showing the roll feed driving mechanism;

Figure 10 is a vertical transverse section on line 10—10 of Figure 9, showing the construction of the ratchet mechanism and the braking means;

Figure 11 is a section on line 11—11 of Figure 10, further illustrating the ratchet mechanism;

Figure 12 is a detail of the lower carrying belt, together with the upper grooved pressing belt, showing the location of the roll-carrying truck, and the adjustable mechanism for controlling the blank to be glued and also the cutting off mechanism;

Figure 13 shows means for adjusting and securing the truck and is taken on line 13—13 of Figure 12;

Figure 14 is a section on line 14—14 of Figure 13, showing means for clamping the truck adjusting means;

Figure 15 is a detail view on line 15—15 of Figure 13, showing how the truck supporting shaft is mounted in its adjusting elements;

Figure 16 is a detail vertical section on line 16—16 of Figure 7 showing the construction for supporting the adjustable visor or shield;

Figure 17 is a section showing the device for holding the blank against the adhesive applying means, and the construction which prevents transfer of glue to the feed wheels when stock is not running;

Figure 18 is a vertical sectional view on line 18—18 of Figure 17 illustrating the adhesive applying means;

Figure 2:
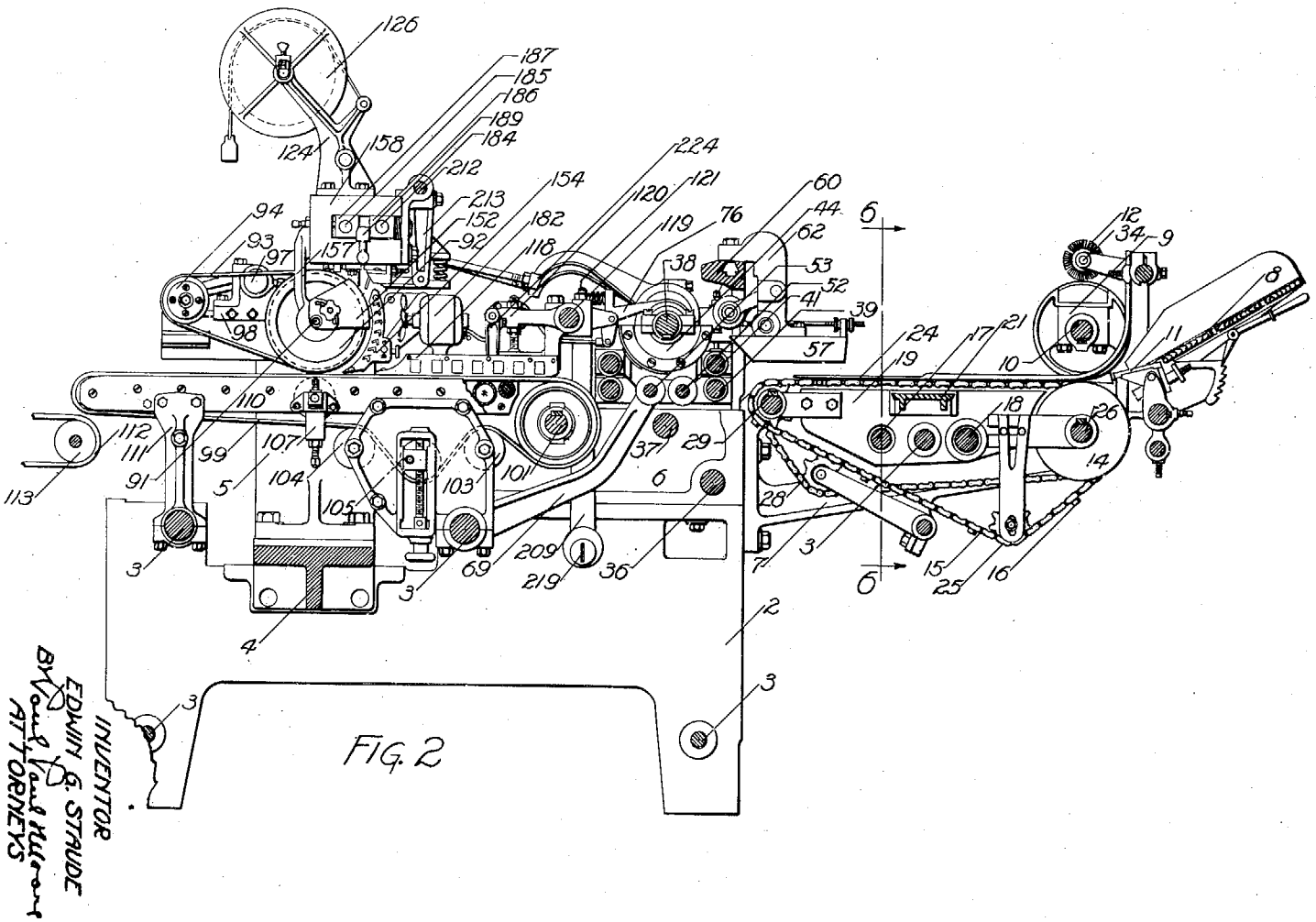
Figure 2 is a longitudinal vertical sectional elevation on line 2—2 of Figure 1.
Figure 3:
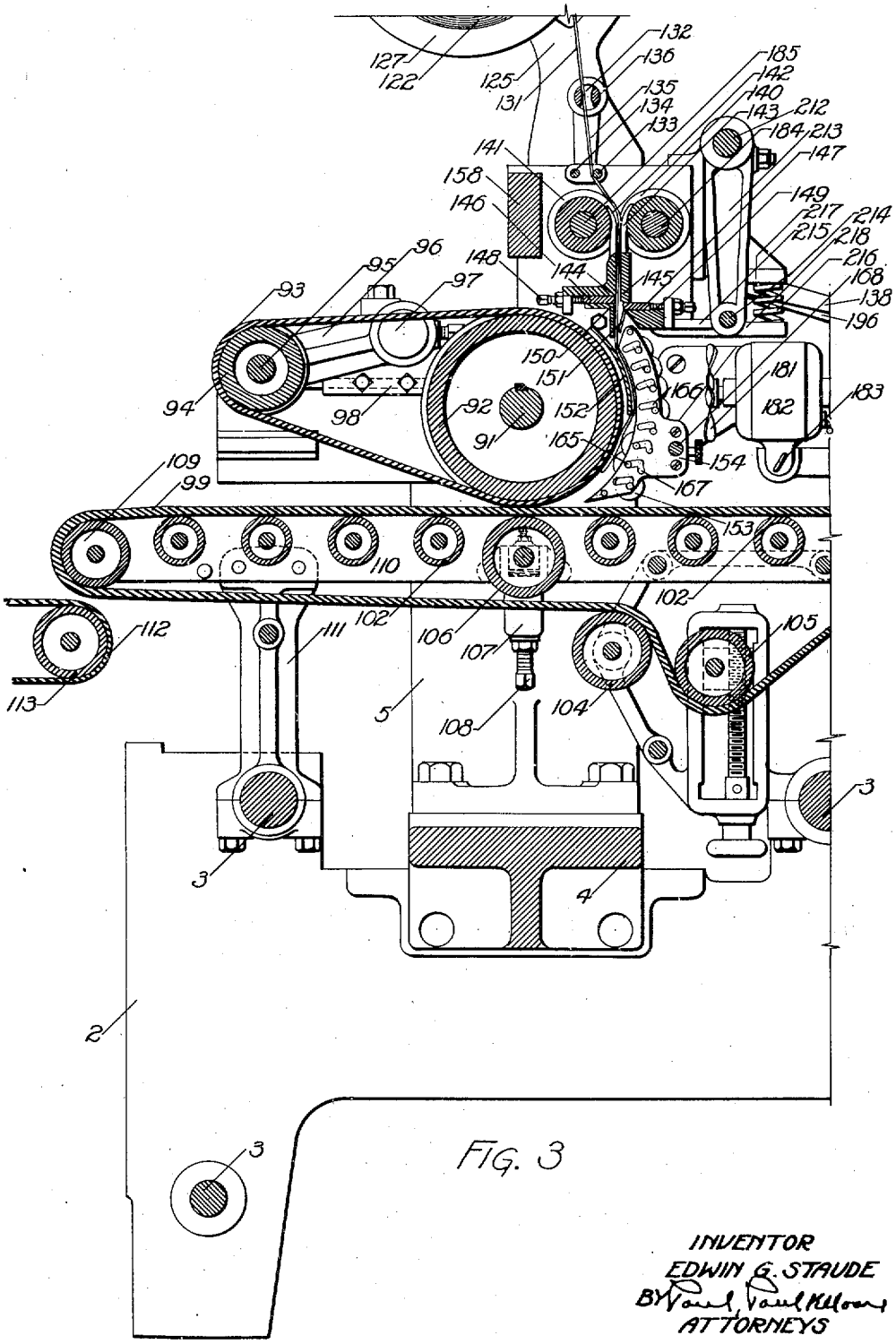
Figure 3 is an enlarged view of the center and rear portion of the machine on line 3—3 of Figure 1.

In the drawings, 2 generally indicates the main frame which consists of upright side castings connected by suitable crossbars 3. 4 is a spreader which connects the two side frames one to another and supports a bracket 5 (see Figures 3 and 8) which supports Cellophane feeding and cutting mechanisms, as well as the pressing device. 6 is a bracket (see Figure 4) which supports the gluing mechanism, and the cam shaft 38, together with the clutch device. 7 are brackets (see Figures 1 and 2) which are bolted to the members 2 and 6, and carry the feeding mechanism.

Figure 6:
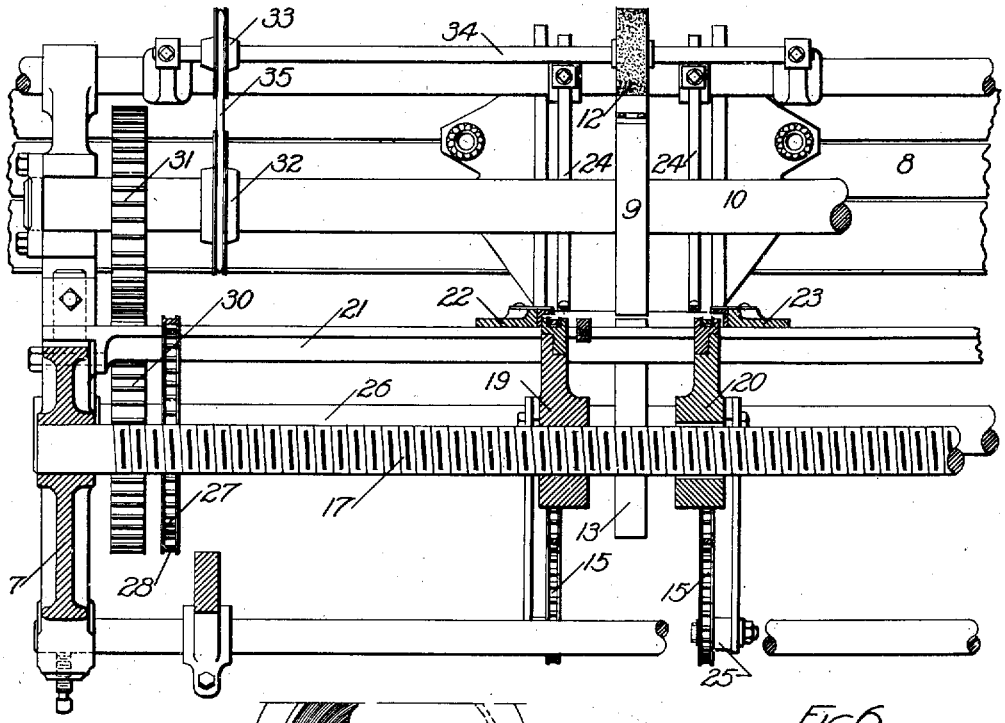
Figure 6 is a vertical transverse section on lines 6—6 of Figures 1 and 2, looking in the direction of the arrow.

The feeding mechanism consists of the usual feed table 8, upon which the blank or material is laid to be fed one at a time by the feed wheel 9 on the feed wheel shaft 10. A suitable retarding mechanism, generally indicated at 11, is provided to permit only one blank to be fed at a time. To keep the blank feeding surfaces (usually of rubber) clear from lint and dust, there is provided a brush 12 which revolves at high speed, and contacts the feed wheel. Below the feed wheel 9 and co-acting therewith is a suitable rubber-covered wheel 13. (See Figure 6.) Adjustably mounted on each side of feed wheel 9 are disc wheels 14 (see Figures 2 and 6) having grooves to receive sprocket chains 15, provided with lugs 16. These lugs are so placed and the chains are driven in such timed relation that as each blank is fed from the feeder table 8, the lugs 16 catch the rear of the blank, and carry it forward into the machine, also in timed relation. The blank-size adjusting mechanism consists of suitably threaded cross-shafts 17 and 18, on which are respectively mounted brackets 19 and 20 (see Figures 2 and 6).

A suitable element 21 cross-connects the brackets 7. The element 21 is provided with side guides 22 and 23 (see also Figure 1) which are adjustable and which engage the sides of the blank to maintain its parallelism to line of feed. Other guiding and controlling rods are indicated at 24, and act to hold the blank upon the feeding chains 15. Suitable idlers 25 are provided, along with means for adjusting them, to take up the slack in the chain 15. The grooved pulleys 14, and the rubber-covered pulley 13 are mounted on a shaft 26, which is driven by a sprocket 27 through a chain 28 from the shaft 29, see Figures 1 and 2.

A spur gear 30 (see Figure 6, also Figure 1) is mounted on the shaft 26 and drives a spur gear 31, which in turn drives the feed wheel shaft 10. Suitable grooved pulleys 32 on the shaft 10 and 33 on the shaft 34 (which carries the brush 12) have the driving connection 35, and thus the brush 12 is operated.

Figure 1:
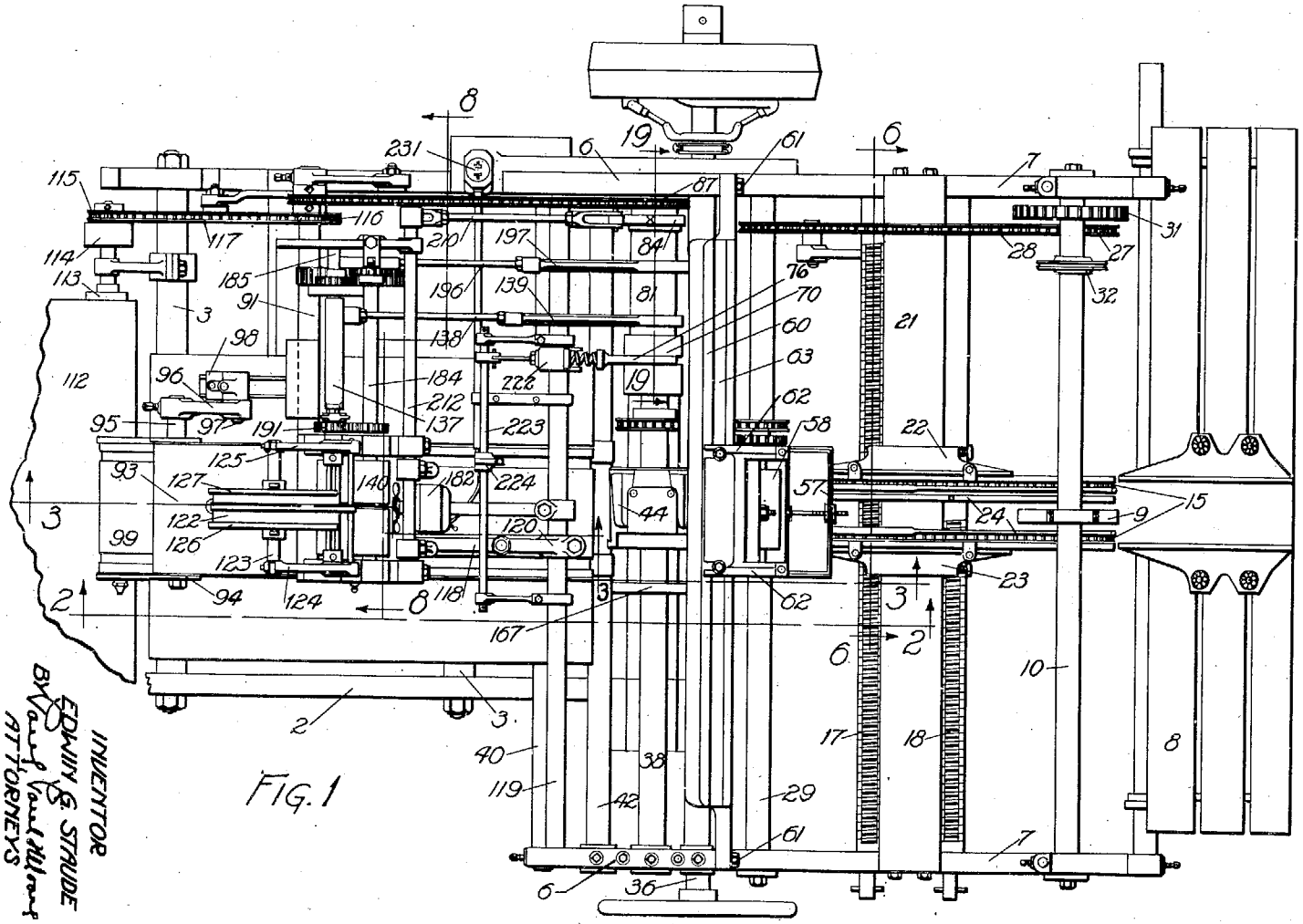
Figure 4:
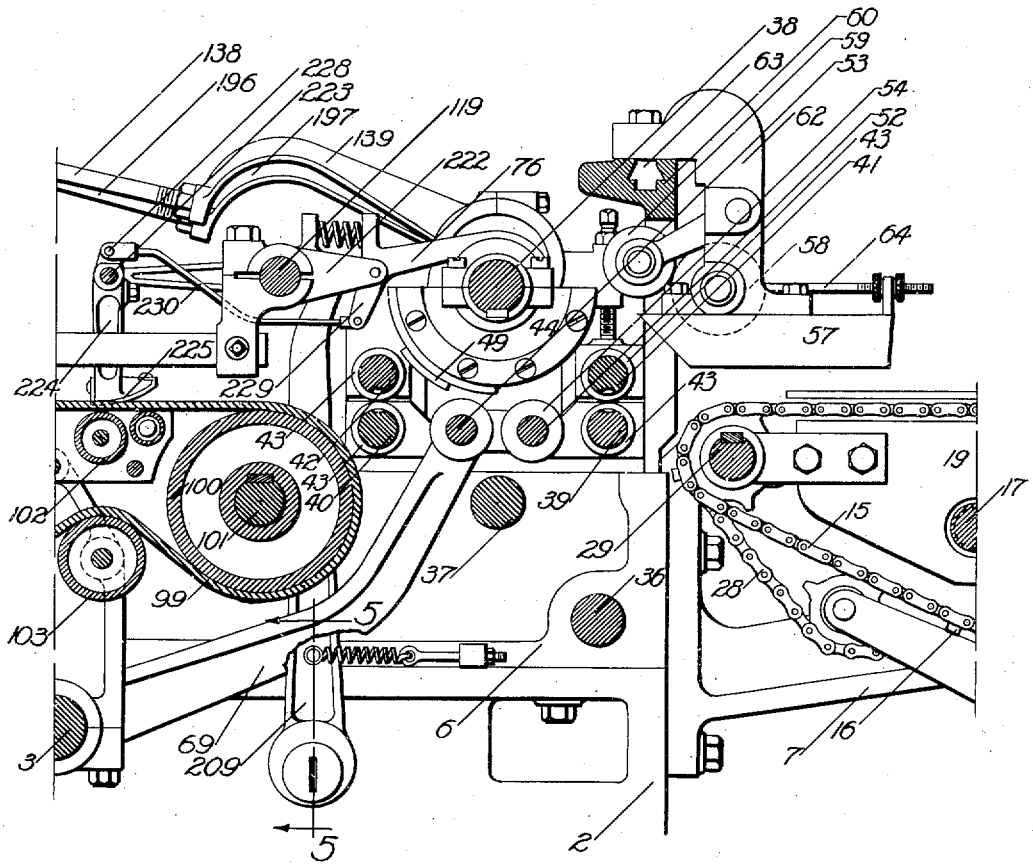
Figure 4 is complemental to Figure 3 and illustrates that portion of the mechanism nearer the feeder section.

Referring to Figures 1 and 4: 36 is the main drive shaft and transfers motion to the shaft 37. The shaft 37 is in turn geared to the shaft 38, also to the shafts 29, 39 and 40. The shaft 39 is geared to the shaft 41 and the shaft 40 is geared to the shaft 42. The shafts 39 and 41 have feeding collars 43. This is also true of shafts 40 and 42. The location of these feeding collars 43 is such that they advance the blank through the machine without coming in contact with the adhesive.

A feature of the invention relates to means whereby any one of a number of adhesive transfer dies of different areas can be attached on the gluing drum for applying glue at any desired location on the article. Referring to Figures 4, 17, 18 and 22: There is provided a semi-circular drum 44 (Figure 17) to which is secured a plate 45 for circumferential adjustment. The plate is held for such adjustment by means of beveled elements 46. Clamp member 47 has a corresponding beveled element and is secured by cap screw 48. On plate 45 is a curved zinc etching plate 49, see Figure 18, held in place by screws 50, engaging screw-threaded sockets or openings of the circumferentially adjustable plate 45. The screw holes are placed about three-quarters of an inch apart and are in regular rows at right angles to one another, see Figure 22. By this arrangement, it is clear that the gluing die 49, which is usually a die-cast metal plate, is first mounted on the master plate 45 in any one of a plurality of positions. This plate 49 is one of a series of plates of different areas or sizes which can be attached to plate 45. The plate 45 can then be circumferentially adjusted and then clamped in the correct position by means of the cap screws 48. The drum 44 can then be adjusted transversely of the feed by sliding along the shaft 28. When it has reached the proper position for applying adhesive, it is clamped by screw 55.

By using a curved zinc etching plate as an adhesive impression or printing member, the adhesive can be accurately printed or applied, and by substituting various printing plates the adhesive can at small expense be applied over any desired area and have any desired contour. In order to hold the blank 51 against the zinc plate 49 to feed it and cause it to be properly held while it receives adhesive, shafts 52 and 53 (see Figure 17) are arranged, in this instance below the drum 44, and parallel with its axis of rotation, the shafts being arranged laterally of a vertical line passing through the axis of rotation of the drum. The axes of the drum and shafts are related substantially as the corners of an isosceles triangle. Each shaft has attached thereto or integrally formed therewith a series of spaced disks 54, see Figure 18. The working faces of these disks extend slightly above the level of the line of feed, and provide a plurality of spaced narrow-surfaced contacts adapted to engage the under side blank, hold it in printing position and feed it. The areas of these surfaces are reduced to a minimum so that if glue is accidentally deposited thereon, the quantity which they will receive will be very small, and so that a very much smaller quantity will be transferred to the bottom of a subsequently fed blank, as in a case where a blank is not in the position shown in Figure 17 when the printing elements 49 assumes the position shown in that figure. By using the disks and having their peripheries crossing the line of feed, in direction of the drum, and by arranging their axes of rotation laterally of a line passing through the axis of rotation of the drum 47, the peripheries of the disk are so placed that they will never come directly in contact with the adhesive-covered surface of the element 49 and, therefore, only in rare cases will any adhesives be transferred to the disks. If it is so transferred, it will be in very small quantity, so that a correspondingly small quantity can possibly be transferred from the disks to the bottom of the blank 51 and therefore a very small quantity can be transferred from the bottom of the blank, to the feed rolls 43 or other feeding elements of the mechanism. This is a valuable feature of the invention.

In order to apply the adhesive to the blank, a certain amount is transferred to the raised portion of the curved plate 49 from the transfer drum 59, see Figure 4. If the disks 54 were placed directly underneath the curved table, then the space between their peripheries and the curved plate would have to be slightly less than the thickness of the stock. Stock, of course, varies in thickness, and for running thinner stock, the disks 54 would be so close that when the machine was operated without feeding any stock, the adhesive would be transferred from the curved plate 49 to disks 54. This is very objectionable because when the next blank is fed, the adhesive on the disks 54 is transferred to the underside of the blank 51 and gums up the rolls 43 on the shafts 40 and 42, and also gums up the belt 99, besides spoiling the stock. By placing the disks 54 in the position shown in Figure 17, that is, one roll on each side of the vertical center line of the shaft 38, and raising the disks 54 slightly above the work line, stock of practically any thickness can be run and with no gumming and spoilage of stock, as aforesaid. In fact, with this construction the space between the disks 54 and the curved plate 49 can readily be two or three times the thickness of the blank 51 and still hold the blank against the surface of the plate 49 firmly enough to positively properly transfer the adhesive. It can be seen by referring to Figure 17, that should a blank 51 not appear, as for instance when the hopper is empty, or when the feeder occasionally fails to feed a blank, then the zinc plate 49 will not come in contact with the disks 54 on the shafts 52 and 53, but has ample clearance, equal at least to the thickness of the stock so that when a subsequent blank is fed there will be no offsetting or transfer of adhesive from the disks 54 to the underside of the blank 51.

Since these disks 54 (which are really "turned" on the shaft) can extend the entire width of the gluing surface, it follows that after once the proper relationship is established between the shafts 52, 53 and 38, no attention need ever be paid to the shafts 52 and 53, even though the outline of the plate 49 is varied throughout the range of the machine.

The sector member 44 is clamped to the shaft 38 by means of a cap screw 55 and can be adjusted laterally on the shaft, and the beveled surfaces 46, already described, permit circumferential adjustments of the plate 45 and glue printing element 49. A spline 56 prevents rotation of member 44 on shaft 38, but permits lateral adjustment.

The glue supplying means includes a glue pot 57, having a transfer drum 58 (see Figure 4) rotating in the glue, and a transfer drum 59 delivers the glue to the plate 49. Both the transfer drums 58 and 59 are mounted in overhead bracket 62 which is bolted to a spreader 60, secured to the side frames 6 by means of a cap screw 61. A beveled or tapered slot 63 is provided in the spreader 60 to permit adjustment crosswise of the machine. The flow of adhesive is controlled through suitable adjusting scrapers shown at 64. The location of the transfer drum 59 is such that the zinc etching 49 will just clear the transfer drum 59 and receive adhesive therefrom.

Figure 19:
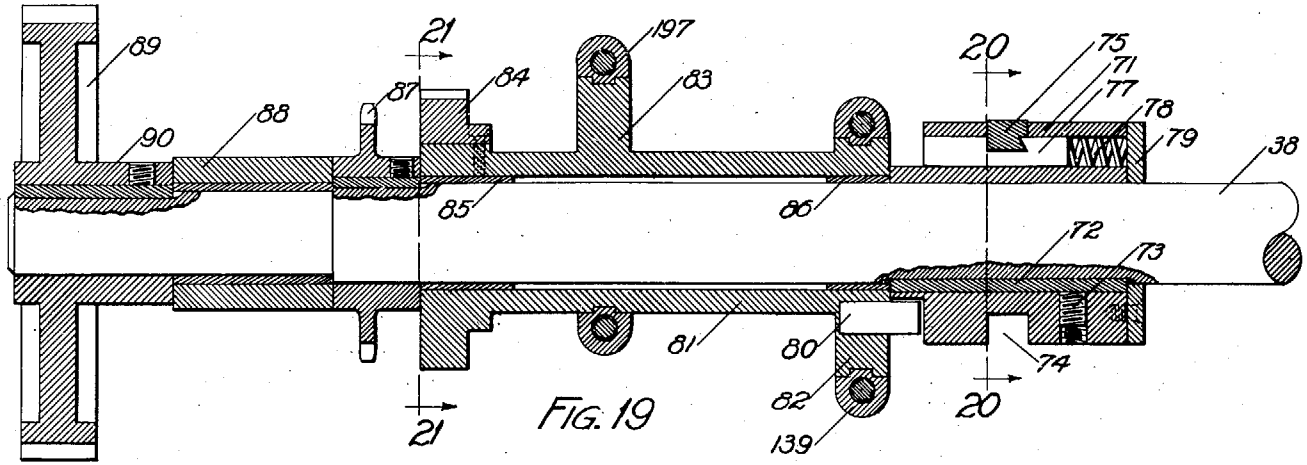
Figure 19 is a section on line 19—19 of Figure 1 showing the cam driving shaft, and showing the tripping clutch in section.
Figure 20:
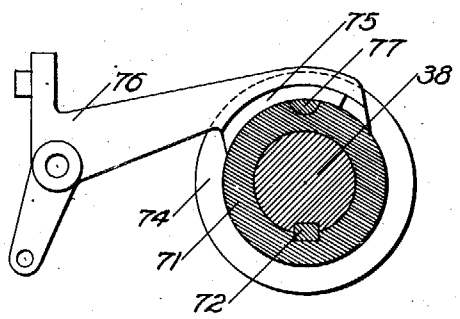
Figure 20 is a detail section of the tripping clutch taken on line 20—20 of Figure 19.
Figure 21:
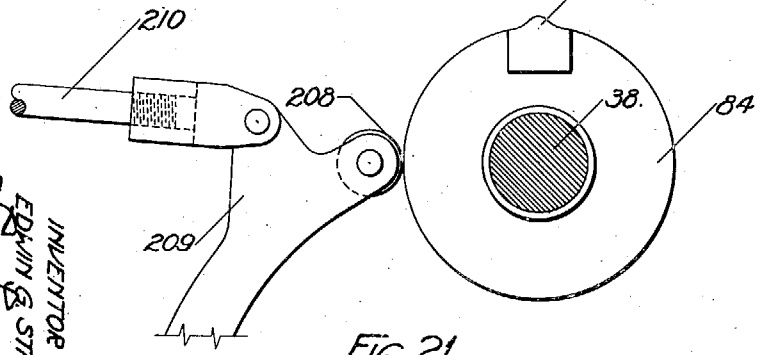
Figure 21 is a detail section on line 21—21 of Figure 19 showing the cutting off cam, together with a portion of the cam arm and connecting rod.
Figure 24:
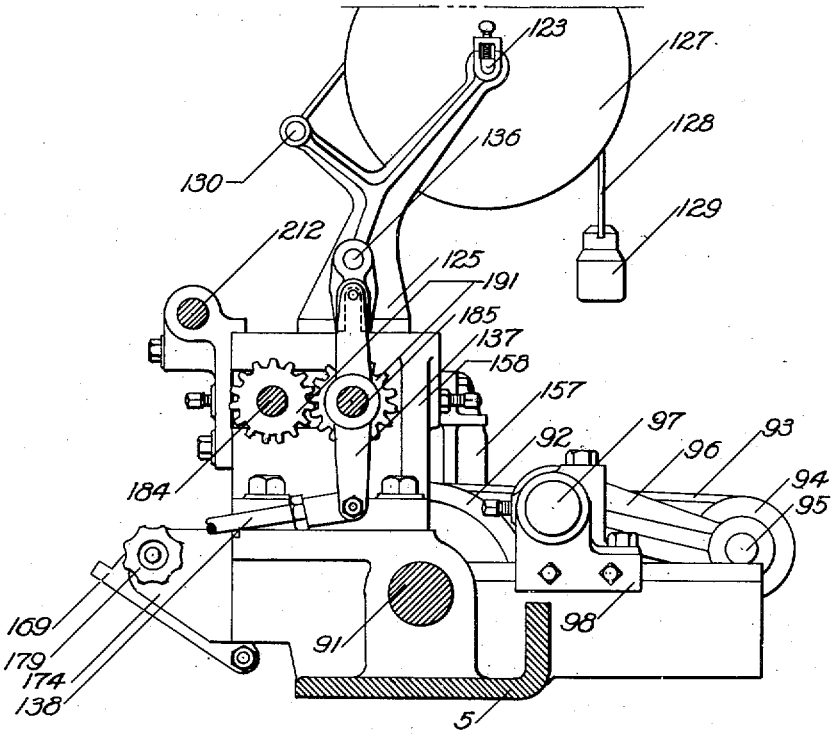
Figure 24 is a cross section on line 24—24 of Figure 8.
Figure 22:
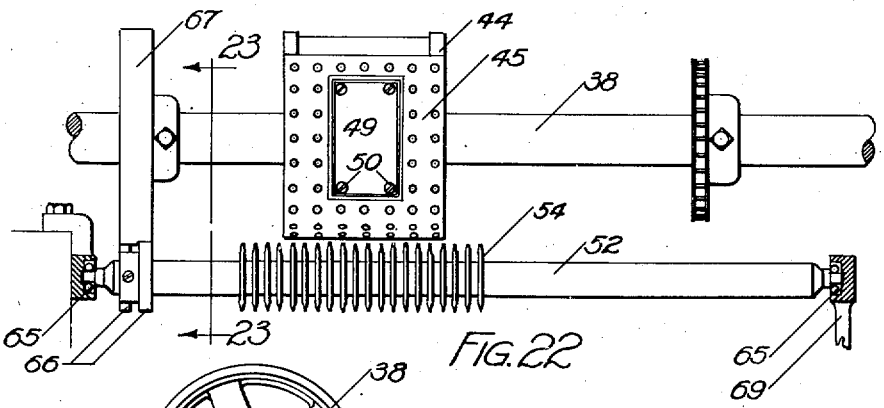
Figure 22 is a detail sectional elevation taken transversely of the machine and showing one of the mechanisms or grooved roller device for holding the blank in contact with the gluing mechanism, and showing the bearings and means for driving the mechanism.
Figure 23:
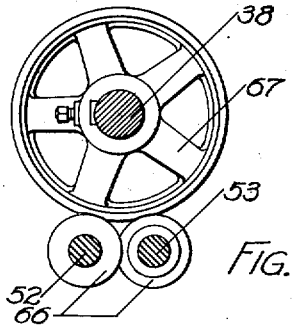
Figure 23 is a cross section on line 23—23 of Figure 22; further illustrating the driving mechanism.

The shafts 52 and 53 are provided with suitable bearings 65 (see Figures 22 and 23) and have suitable smooth, flat pulleys 66, driven by a rubber covered wheel 67, which is mounted on the shaft 38 and revolves therewith. The bearings for the shafts 52 and 53 are mounted in a bracket 69 which is clamped on a spreader shaft 3. The shaft 38 also carries the clutch or throw-out mechanism 70 (see Figures 19, 20 and 21) which consists of a member 71, secured to the shaft 38 by a key 72 held in place by a set screw 73. Member 71 has a groove 74 adapted to receive the arcuate part 75 on the clutch arm 76. A clutch pin 77 is held in the "out" position by the spring 78, which in turn is kept in place by a plate 79. The spring causes the clutch pin 77 to be moved into the path of the pin 80, secured to the member 81, which carries the paper regulating cam 82, and the roll feeding cam 83, and also carries the cut-off cam 84. The member 81 is free to revolve on the shaft 38 and is provided with brass bushings 85 and 86. These bushings are provided with suitable lubricating means, not shown, and the member 81, therefore, only revolves when the clutch pin 77 is in engagement with the projecting pin 80. When the arm 76 is down in the groove 74, an inclined surface of the element 75 forces the clutch pin 77 back against the tension of the spring 78 into the position shown in Figure 19, and therefore past the pin 80 at just the time when the pin 77 is clear in. The construction of this clutch is similar to clutches usually provided for this purpose, but the purpose of this clutch is to stop the cutting mechanism, the feeding mechanism, and the mechanism for taking up the slack to permit continuous pull on the roll.

The shaft 38 is provided with a sprocket 87 and has a bearing in the member 88 which is a part of the bracket 6 and is driven by the spur gear 89, which is keyed at 90. The sprocket 87 drives the shaft 91 (see Figure 1) which carries the pulley or drum 92 (see Figure 3) over which the grooved belt 93 is stretched around the idler 94, mounted on a suitable shaft 95 and hung on an arm 96, pivoted at 97 in an adjustable sliding box 98. Referring to Figure 4, after the blank has received the impression of adhesive, and has passed between the collars 43 on the shaft 42 and member 44, it then passes on to an endless carrier belt 99 which is driven by a drum 100 on a shaft 101 that is driven from the train of gears (not shown) that drive the shaft 40. The belt 99 is supported by suitable idler rolls 102, and the belt-tightening mechanism 103, 104 and the tightener pulley 105. In order to hold the belt 99 in yielding contact with the belt 93, there is provided directly underneath the shaft 91, an idler pulley 106, urged upwardly by a suitable spring mechanism (not shown) in the member 107, the tension of the spring being adjustable by set screw 108. The belt 99 passes over a pulley 109 and all of the idler pulleys and the pulley 109 are mounted in suitable frames 110 (see Figure 8) which are carried by brackets 111 and clamped on the cross shaft 3. A suitable conveyor belt 112 (see Figure 1) is provided, consisting of a drum 113, around which the conveyor belt 112 passes, the drum being driven by a gear reduction mechanism, generally indicated at 114, driven by a sprocket 115 from a sprocket 116 on the shaft 91, through a chain 117.

The foregoing description includes the mechanism required for feeding the blank or other material by means of the feed wheel 9, carrying the blank forward in timed relationship by the lugs 16 on the chain 15, delivering the blank to the collars 43 on the shafts 41 and 39, applying the adhesive through the action of the zinc etching 49, while the blank 51 is being held in contact by means of the members 54, then feeding the blank 51 into the collars 43 on the shafts 40 and 42. The blank then passes to the endless belt or carrier 99, which is driven by the drum 100 on the shaft 101, and is held down on the belt 99 by a suitable top carrier mechanism 118, see Figure 2. This mechanism consists of a series of idler rollers which bear on the upper surface of the blank, and is secured to a shaft 119 by a suitable bracket 120, clamped in position by the stud 121. The blank next passes underneath the grooved belt 93, which feeds down the second material to be glued, as hereinbefore described.

Figure 7:
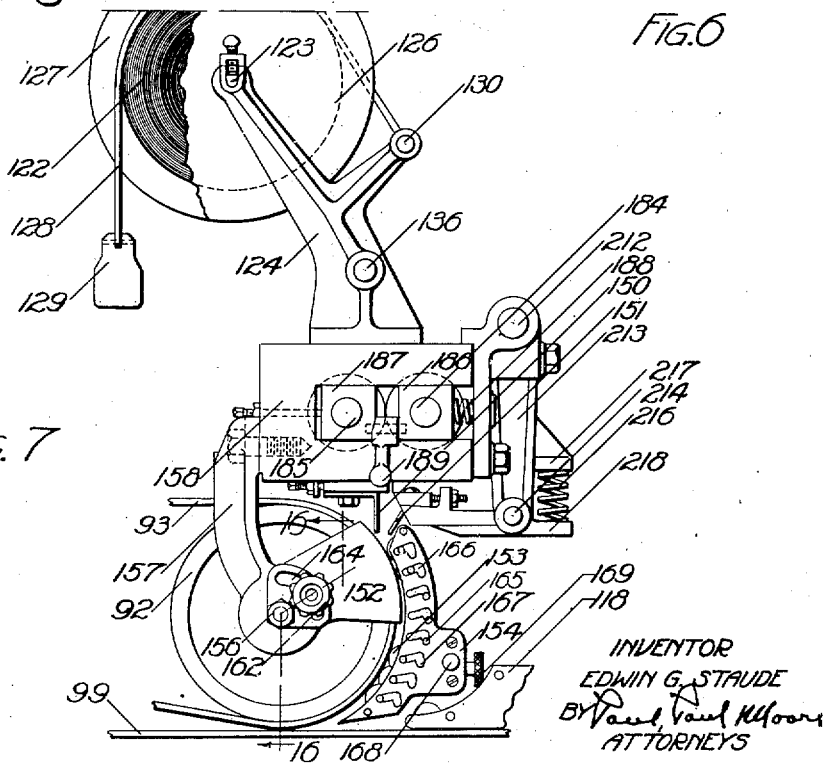
Figure 7 is a detail elevation of a portion of the roll feed mechanism shown in Figures 1 and 3.

The mechanism for feeding the material to be glued, cutting the same, and causing it to register with the aforesaid blank as it passes through the machine is as follows: A roll of stock 122, such as glassine paper, Cellophane or other material, is placed on a spindle 123 (see Figures 1, 2 and 7), the spindle being mounted in brackets 124 and 125. Suitable disks 126 and 127 are adjustable on each side of the roll 122 to keep it in position (see Figure 1). A friction strap 128, having a weight 129, and pivoted at 130, rests over the outer periphery of the roll 122 and keeps it from over-running, so that no slack will accumulate from the roll as it is fed through the machine.

Means for continuously rotating or revolving the supply roll to prevent accumulation of slack, is an important feature. The present means for accomplishing this operates so that when the feed rolls are at their maximum speed, a tension arm 135 is at minimum speed, but the arrangement is such that the arm 135 has a continuous motion in a manner to exert a continuous pull on the strip and cause the reel 127 to move continuously. This is a great advantage over the old gravity-operated device which put such tensile strain on the paper that it was frequently irregularly torn or broken.

The material 131 (see Figure 3) is threaded down through a guide slot 132, and between two bars 133 and 134. These bars are mounted on an oscillating arm 135 and secured to a shaft 136 that contains the slot 132. To provide an oscillating motion for the shaft 136 (see Figure 1) a depending arm 137 is provided, the end of which is connected with a pivoting rod 138 that is connected to an eccentric strap 139 on the eccentric 82 (see Figure 19). The eccentric 82 is set in the proper synchronizing relation to eccentric 83, which operates the adjustable feeding mechanism hereinafter described, so that as the feed rolls 140, 141 (see Figure 3) feed the material 131 downwardly at the maximum speed, the slack will be "paid in" by the rods 133 and 134, and as the feed rolls slow down to the stopping position, the rods 133 and 134 will swing outwardly and in that way cause practically a continuous rotation of the roll 122. The material 131 is fed down between the feed rolls 140 and 141. These rolls have a small groove in the center adapted to receive tongues 142 and 143 to facilitate in threading the stock down between the frame and guide members 144 and 145.

A stationary cut-off knife 146 is provided having a movable cut-off knife 147 co-acting therewith. Suitable adjusting screws 148 and 149 are provided for adjusting the knife to the proper lap.

Other guides for the material are provided below the knife, as indicated at 150 and 151. If the material were fed directly against the belt 93 (which is preferably composed of a rubber and canvas composition), the grab or suction would be so great that it would draw the stock between the rolls 140 and 141, and if these rolls were set so tight that the stock would not draw, then the stock would not feed down in parallelism, but would become wrinkled when passing through these feed rolls. If the belt 93 pulls too hard on the material 131 before it is cut off, it will tear during the cutting operation, that is the knife begins cutting on one edge, according to the "shear" principle, and before the material is cut off, and if the suction is too great it tears at an angle, which is very objectionable.

Another feature, therefore, is the use of a rubber and/or grooved belt as a feeding means, and as a means cooperable with the blank-advancing belt to press the registered material, which type of belt has greater traction capacity, and when grooved reduces the "freezing" effects of "static." Another important feature is this particular kind of a belt in combination with some means for lightly holding the material against the working surface of the belt, either by the use of gravity-actuated roller, or by an air blast, and/or with means for varying the area of contact.

An adjustable shield or visor 152 is provided to keep the material 131 away from the belt 93, except for a distance equal to two rolls 153, in the truck 154. This visor or shield 152 extends clear across the belt 93 that is provided with grooves 155 (see Figure 12). The shield 152 has a lateral flange, which is pivoted as at 156 to bracket 157 bolted to the frame 158 (see Figures 2, 7, 8 and 16). In order that the pivot 156 shall be concentric with the shaft 91, a stud 159 is provided (see Figure 16), which extends in a socket 160 in the end of the shaft 91. Since the shaft 91 revolves, and because of the difficulty of providing proper lubrication, and in order that the stud 159 will not "freeze" to the shaft 91, a wood bushing 161 is provided. This bushing is specially treated material soaked in oil and therefore requires no lubrication, since there is little load on the bearing at this point. Since the visor or shield 152 is pivoted at the point 156, it can be swung around the drum 92 concentrically with the belt 93 into any desired position, to regulate the amount of material 131 which is to be directly opposed to the face of belt 93. To accomplish this regulating adjustment, a hand wheel 162 is provided, adapted to tighten up on a belt 163 and clamp the member 152 against the bracket 157. A concentric slot 164 is provided in the casting 157, through which slot, bolt 163 carried by the visor or shield 152 passes. After shield adjustment, the same is securely clamped by wheel 162.

Each small idler wheel 153, in the truck 154, has a shaft 165 (see Figure 7) rotatably stepped in the inclined slots 166 of the plates. Each slot is L-shaped with a downwardly directed portion spaced a greater distance from the periphery of the belt 93 than the other portion of the slot. Each shaft may, therefore, be rolled in a direction away from the face of the belt to drop into this downwardly directed portion, thereby preventing its wheel or roll 153 from contacting the material 131 or belt 93. In this way, the rollers can be selectively positioned, and as many used as desired. The truck 154 is adjustably pivoted on the shaft 168, and is clamped to the shaft by hand wheel 169, see Figures 7 and 12. In order to provide what may be termed a universal adjustment for the shaft 168, and the truck thereon, for bodily moving them vertically and horizontally, and for rotating the shaft, the shaft is non-rotatably attached to member 169 (see Figures 12, 13, 14 and 15) and is rotatably journaled in plate 171, see Figure 15, as at 170 so that the shaft can be rotated when plate 169 is adjusted. Plate 171 is pivoted as at 172 to member 174 and may swing toward or away from the belt 93 to correspondingly bodily move the shaft 168 and the truck 154 thereon. For this purpose, the member 174 is provided with a slot 173, and the member 169 is provided with a slot 178. A stud 177 extends through these slots and is secured in the member 171 and has its opposite ends threaded as shown in Figure 14. The hand wheel 175 engages threads 176 to clamp the plate 169 in adjusted position and hand wheel 179 engages with the threaded portion 180 to co-act with the bracket member 174 to secure the plate 171 in adjusting position. The slot 173 is also shown in Figure 13 in dotted lines and it will be noted that the slots 178 and 173 are angularly related, so that vertical and horizontal adjustment of the element 168 may be obtained, by properly manipulating the elements 169—171.

The adjustable shield 152 provides means interposed between the material, and the feed and pressure-applying belt, which is adjustable to control the area of and degree of contact between the material and the belt. Moreover, a light continuous contact of the rollers 153 with the material to be cut is obtained and this contact is maintained with the constantly moving working surface of the feed and pressure belt, whereby the material instantly takes the speed of the working surfaces, directly it is severed. This is of great advantage because if there is any appreciable delay in the motion of the material toward the registration point, accurate registration is imposible. It is notorious in machines of this class that a large amount of material is wasted because of poor registration or failure of registration at this point. As herein practiced, the material can be held in light but continuous contact with the feed and pressure belt. Heretofore, various devices have been used such as providing a stop for the material, but this is not applicable to flimsy materials. The maintaining of a light and continuous tension is an important feature, as is the ability to vary the degree of tension, as well as the area of contact, and the ability to apply the contact nearer or farther away from the severing point of the material.

The shafts of the rolls 153 can be easily raised from the slot portions 167 and put into operative relation, or vice versa, and thus the area and degree of contact can be varied.

Frequently the material 131 is very thin and apt to curl. I have found that a light blast of air may be employed to hold it against the visor 152 or against the belt 93. For this purpose, a small electric fan 181 is used and is driven by a motor 182 adjustably mounted as at 183 to direct the blast at any required angle, the motor being driven by the usual electric connection.

As is common in feeding web stock, a great deal of static electricity is generated, and when this comes in contact with a non-conductor, such as the surface of the belt 93, it follows that it adheres to such surface so strongly, that it is with great difficulty that winding is prevented. It is true that there is "tack" in the adhesive that is printed on the blank, and with which the material 131 is intended to match up and stick to, yet the "tack" is frequently not sufficient to cause the material 131 to stick to the blank, yet it will adhere to the belt 93 and wind therearound. If the amount of "tack" in the adhesive is increased sufficiently to hold the material 131, then the adhesive is so "tacky" as to cause "stringing" and in a short time the glue will be transferred to gum the entire machine.

I have devised a means for reducing the static effects by fifty per cent, to-wit: by cutting grooves in the belt 93, so that the contact area is proportionately reduced without adversely affecting the pressing or feeding function of the belt 93 relative to belt 99, to obtain perfect adhesion of the material 131 to the blank. The grooves, therefore, reduce the static by fifty per cent, provided their aggregate area is equal to the contact area. The grooves may be utilized to receive wire stripper members which can be threaded therein to prevent the material 131 from winding or sticking by means of static, but it has been found that with a reduction of fifty per cent in static effects, this winding is practically entirely eliminated, and, therefore, no stripping means is shown. The grooves also have the advantage of reducing the working area of the belt, so that if adhesive is accidentally applied, the quantity which it can receive is reduced by fifty per cent.

Another valuable feature is that with the light contact made by the rolls 153, slippage may take place between the material and the belt 93 so that there is never sufficient pull on the material to cause it to tear unevenly while being cut, particularly when the shearing method of cutting is used.

It is contemplated herein to use a fan or equivalent air blast for maintaining contact of the fed Cellophane or like material with the belt, or to use the light roller contacts 153 separately, or to use these means in combination.

There is also a decided advantage in using a belt instead of a rubber covered drum (92), because it is easier to so time the machine that in case glue reaches the belt at any particular point, this glue will not be so likely to register at some later time with the material 131 as it is fed, until possibly after a considerable number of revolutions during which time the adhesive (which is of the quick setting variety) will have so dried to such an extent that it will not be likely to stick to the material 131. In addition, the use of the grooves so reduces the possible area of contact of the glue that it even more quickly dries and flakes and drops off. Therefore, by the use of this invention, the deleterious effects of the deposit of glue on the feeding and compressing means is reduced to a negligible minimum.

Figure 8:
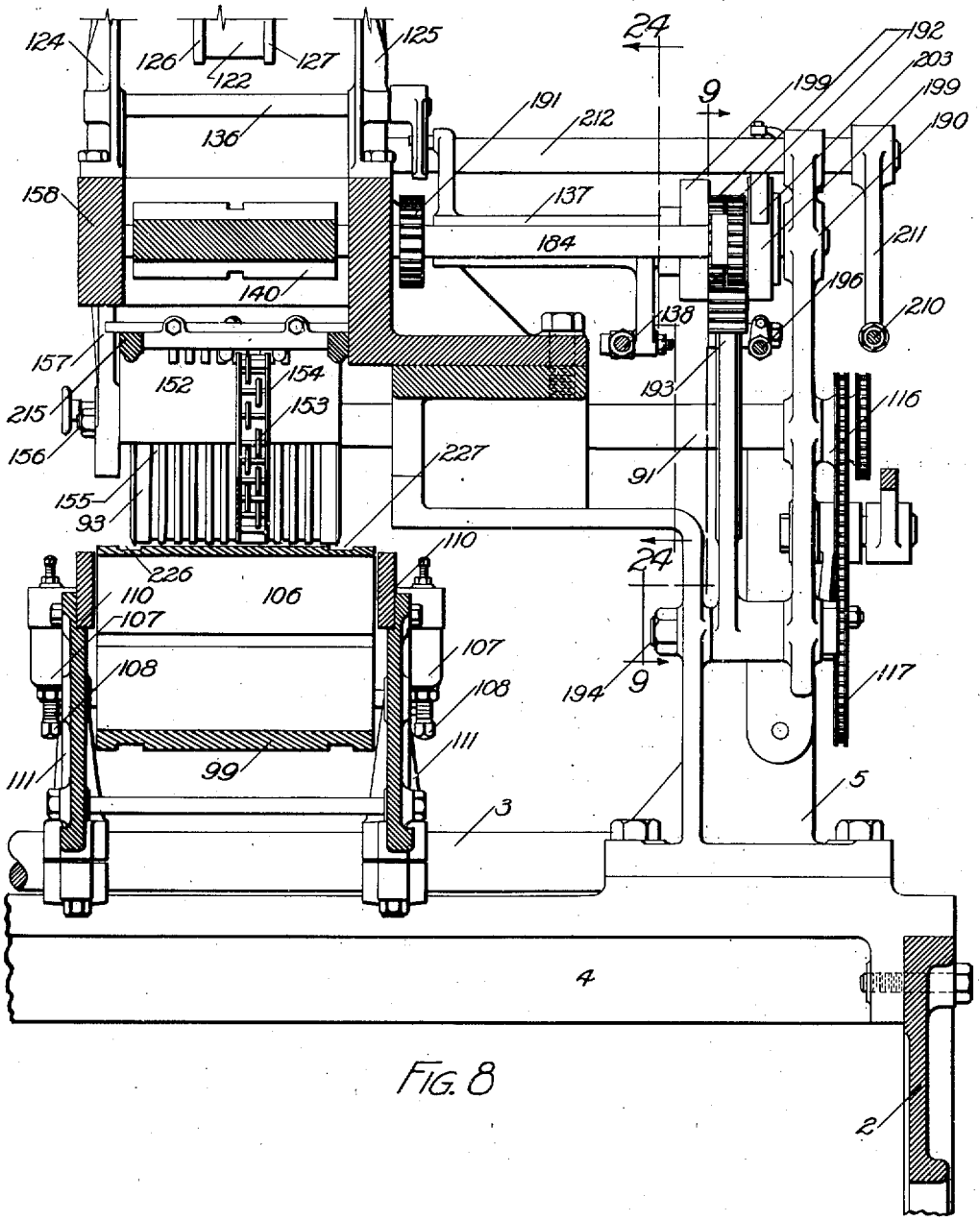
Figure 8 is a transverse section on line 8—8 of Figure 1, looking in the direction of the arrow.

Referring to Figures 1 and 8, it is to be noted that the Cellophane feeding, cutting and registration mechanism is arranged so that every important part can be directly viewed by the operator as he stands at the side of the machine. Moreover, all the adjustable working parts are readily accessible, particularly the rollers 153, and the adjusting means for the shield 152, see also Figure 7. The adjusting means for the truck 154 is also readily accessible.

I have also discovered that when the fan 181 is set at a certain angle, for short work, and the shield 152 is raised practically out of contact with the material 131, the blast of air flowing in the grooves 155 tends to reduce the suction to just the required amount, and in that way greatly assist in controlling the material 131 as it passes down into contact with the blank to which it is to be secured.

The mechanism for operating the cut-off knife, and for intermittently driving the feed rolls 140 and 141, is as follows: The feed roll 140 is mounted on a shaft 184, and the feed roll 141 is mounted on a shaft 185. These shafts have suitable bearings 186 and 187, see Figure 7. The roller 140 is held in contact with the roller 141 by a spring 188 pressing against the bearing 186, and in order to initially pass the paper between the feed rolls 140—141, a small cam arrangement, generally indicated at 189, is provided, the raising of which separates the bearing 186 from the bearing 187, and correspondingly separates the feed rolls.

Other bearings are provided at 190 (see Figure 8). Gears 191 on the shafts 184 and 185 establish a driving connection between the rolls 140 and 141. Referring now to Figures 8, 9, 10, 11, the means for operating the feed roll shafts includes a gear and rack mechanism, comprising a gear 192 driven by a rack 193, the rack being pivoted at a point 194, and motion to the rack being obtained through an adjustable connection 195, and a connecting rod 196, see Figure 1, which, in turn, is connected to the eccentric strap 197 (also see Figure 19) motion to which is given by the eccentric 83 on the shaft 38. By adjusting the clamping connection 195 in the slot 198, the stroke of the member 193 can be varied, and, therefore, of course, the degree of rotation of the shafts 184 and 185. Each shaft 184, 185 has a gear 192, and connected to each is a disk 199 (see Figure 11), carrying a series of ratchet dogs 200. These ratchet dogs are held into contact with a ratchet wheel 201 by springs 202. The ratchet wheel 201 is keyed to the shaft 184 and a similar mechanism to the shaft 185. The teeth in the ratchet of one mechanism are in a direction to feed the material 131 between the rolls 140 and 141 downward and slip over the other corresponding ratchet. On the return stroke the opposite ratchet takes effect and the first one slips, so that rotation of the shaft 184 in the direction of the arrow (see Figure 9) is accomplished by the connecting rod 196 moving in one direction, and rotation of the shaft 185 in the direction of the arrow is accomplished by the movement of the connecting rod 196 in the opposite direction. The purpose of this is to make use of both the forward and return stroke on the eccentric to feed down the material.

Figure 5:
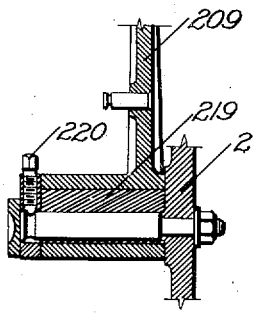
Figure 5 is a detail vertical section on line 5—5 of Figure 4, showing the eccentric mounting of one of the cam levers.
Figure 25:
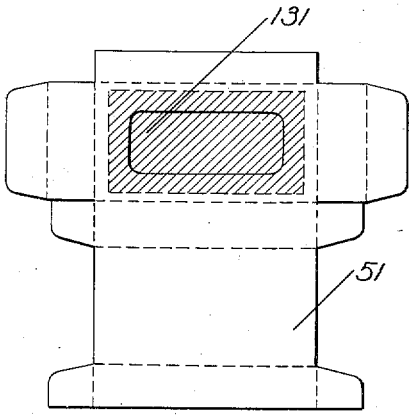
Figure 25 illustrates one type of operation performable by this machine, and represents a folding box blank having a "window" over which a transparent material, such as Cellophane, has been glued.

Since the "dead center action" of the eccentrics occurs twice per revolution, advantage is taken of one of these no-motion periods, when neither shaft 184 nor 185 is revolving, for operating mechanism for cutting the material 131. There is also provided a small brake structure 203 (see Figures 9 to 11) which has a brake shoe 204 that bears against one of the ratchet members and is kept under yielding tension by a spring 205. This brake member is fastened to a part of the frame on the machine at 206. The purpose of this brake is to prevent "overrunning" and the tension is adjusted so that when the gears 192 reach their maximum stroke, the ratchet 201 will not over-run and thereby cause an un-uniform length of material 131 to be fed. This mechanism for cutting off the material 131 at the dead center point of the eccentric 83 is accomplished by cam 84 (see Figures 1, 19, 21) which has a raised portion or tip 207. This raised portion is so timed that it will strike the roller 208 and operate the arm 209 and with it the connecting rod 210. This rod 210 is connected to an arm 211, which in turn is secured to a shaft 212, see Figure 3. The shaft 212 is mounted on a suitable bearing and has depending arms 213, pivoted as at 214 to casting 215 that supports the knife 147. In order to keep the knife 147 in shearing contact with the knife 146, I provide a spring 216 between lugs 217 on the arm 213, and lugs 218 on the member 215. From the description, it is clear that as the cam 84 with the projection 207 revolves in timed relation to strike the roller 208 when the eccentric 83 is at dead center, it will produce a short, quick reciprocating motion of the arm 209, and through the connections described, operate the knife 147 and cut the material 131. In order to get exact adjustment, so that this motion will take place absolutely on dead center, I provide an eccentric bushing 219 (see Figures 5 and 21) at the pivot of the arm 209 and secure the eccentric bushing into position by a set screw 220. As the bushing 219 is revolved, it raises or lowers the arm 209 and thus regulates the time accurately in which the raised portion 207 on the cam 84 strikes the roller 208.

For the purpose of operating the clutch arm 76 (see Figures 1, 4 and 20) there is provided a shaft 119 which supports the fork mounting 222 (see Figure 1) for the arm 76. It also supports the shaft 223, on which is mounted a depending arm 224 (see Figure 4), having an inclined radial surface 225. The inclined surface 225 is adapted to operate in the groove 226 (see Figure 12) and 227 of the lower carrier belt 99. The depending arm 224 is adjustable so that it may operate in either groove 226 or 227, depending on shape of blank. It follows that when the material fed past the gumming or gluing mechanism on this belt 99 strikes the inclined surface 225, element 224 will be raised and shaft 223 oscillated to in turn rock the opposite end of the member 224 at 228 (see Figure 4). This member is connected to a depending arm 229 on the member 76 by a rod 230. Therefore, when the blanks pass through the machine continuously, the arm 224 will at all times keep the arm 76 raised, and consequently the inclined surface 75 (see Figure 11) during the time when the pin 77 passes this part 75 and, therefore, will have no action on the pin 77, and the machine will operate continuously. Should, however, the blanks not be delivered to the belt 99, the inclined surface 225 of the depending arm 224 assume the position shown in Figure 4 and cause the arm 76 to drop into the groove 74 and withdraw the pin 77, and thereby de-clutch the mechanism that controls the eccentric 82—83 and cam 84, and these members will remain inoperative until a blank is delivered, at which time shaft 223 is moved to raise the member 76, release pin 77 so that it again engages pin 80.

The operation of the machine is as follows: Blanks are placed in the feeder 8; the feed wheel 9 in revolving, picks off one blank per revolution and carries it out over the top of the chain 15. Lugs 16 on the chain catch the rear of the blank and carry it forward in timed relation to be received by the collars 52 on the shafts 39 and 41. The blank then passes over the rolls 54 and receives the imprint of the adhesive from the projection 49 in the proper position. It is then advanced between the rolls 43 on the shafts 40 and 42. The blank next passes between the belt 99 and the pressure carrier 118. During this time, the proper amount of material 131 is fed down between the rolls 140 and 141 the distance that the roll feeds the material 131 down, being first regulated by the adjustment 195 in the slot 198, which determines the stroke of the member 193 and, therefore, the distance that the shafts 184 and 185 will revolve.

As the material 131 is fed down (see Figure 3) over the surface of the shield 152, the first few rollers 153 directly over the shield 152, are placed in the rear of the slot 166, the lower part of which is indicated by the reference figure 167, and are, therefore, inactive. As the material continues to be fed downwardly it comes in contact with the grooved belt 93, which is operating continuously, and acts as a continuous feeding means. At this point, the rollers 153 are set out into the opposite position in the slot 166 on the member 154 and serve to bear the material 131 against the moving surface 93. From this description it is clear that the material 131 is kept under tension continuously because the speed of the surface 93 is much faster than the speed of the rolls 141 and 142. By tilting the fan 181 at the proper angle, additional pressure may be obtained as required.

Since the feed rolls 141 and 142 are driven intermittently, it follows that the cut-off knife 147 must operate during the period that the eccentric 197 is passing over a dead center. At this point, the projection 207 on the cam 84 strikes the roller 208 and rocks the knife inwardly and cuts off the material 131, which has been fed down to a predetermined length, as hereinbefore described. Directly that the material is severed and being in perfect contact with the moving surface 93, it immediately takes on the surface speed of the belt 93 and meets the blank to which it is to be pasted, in timed relation at the point of contact of the belt 93 with the belt 99. Since the shield 152 is adjustable for different lengths, it is clear that the shield can be rocked counterclockwise and give the rollers 153 a chance to contact with the material 131 earlier in the cycle of operation by merely lifting the rollers 153 out of the space 167 and permitting them to roll by gravity to the opposite direction in the slot 166.

It is, of course, obvious that this machine may be set in front of any folding box refolder and gluing machine; and belted as one unit, so that the entire operation of applying transparent material over the windows of cartons, refolding, gluing, folding, counting and stacking may be accomplished in one operation. In fact, the machine is now so constructed that either the conveyor 112 can be used, or it may be removed and the machine will then deliver the blanks directly to a folding box gluing machine.

Another important feature never before accomplished in a machine of this kind, are the various arrangements by which the machine can be quickly set for different sizes of blanks. In other words, the great advantage is provision of means for obtaining a large size range adjustment, and for obtaining it quickly.

I claim as my invention:

1. A device of the class described including belts adapted to feed material delivered between them, means for delivering material between the belts, and means for varying the area of contact between the material and one of the belts.

2. A device of the class described including two elements adapted to feed material delivered between them, means for delivering material between them, and means adapted to press the material against one of the feeding elements, and vary the area of contact between the material and said element.

3. A device of the class described including belts adapted to feed material delivered between them, one of the belts having a series of grooves in its working surface extending in direction of feed.

4. A device of the class described including belts adapted to feed material delivered between them, means for delivering material between the belts adjacent the meeting point of the belts and means for varying area of contact between the material and one of the belts, and varying the degree of pressure.

5. A device of the class described including means adapted to feed material delivered between them, means for delivering material therebetween, and rollers adapted to act by gravity to maintain contact of the material with one of the feeding means and adjustable to selectively vary the area of contact and contact pressure.

6. A device of the class described including a belt, a second belt with which said first is cooperable, means for feeding material toward the belt adjacent the meeting point of the belts and means for directing an air blast toward the meeting points, and additional means for preventing contact of the material with the belt until the fed material approaches the meeting point of the belts.

7. In an adhesive applying mechanism, a drum having an adhesive transferring means, means for applying adhesive to said transferring means as the drum rotates, means for feeding material, means adapted to receive the material from the feeding means and hold it in contact with said transferring means, including a pair of rolls substantially axially parallel with the axis of the drum each comprising a plurality of spaced concentric disks of the same diameter and having peripheries extending toward the drum and across the line of feed, but spaced so as not to contact said adhesive transferring means, one arranged at each side of a line drawn through the axis of rotation of the drum.

8. In adhesive applying mechanism, a rotatable adhesive transferring means, means for feeding material, means adapted to receive the material from the feeding means and to hold it in contact with the transferring means, including a pair of rolls having peripheries extending toward said transferring means across the line of feed but spaced so as not to engage the transferring means, one roll arranged at each side of a line drawn through the axis of rotation of said transferring means, and having their peripheries near one another, and the length of the face of the transfer means in direction of rotation being not substantially greater than the distance between the rotative axes of the rolls.

9. A device of the class described including means for feeding one material, means for applying adhesive to the fed material, means for receiving the material after application of adhesive and advancing it, means for feeding a second material and causing it to register with the first, means for severing said second material into predetermined lengths, means for varying the degree of contact of the second material with its feeding means, and means for applying pressure to the materials to adhesively connect them.

10. A device of the class described including means for feeding one material, means for applying adhesive thereto, means for feeding a second material and causing it to register with the adhesive of the first, and means for varying the degree of contact of the second material with its feeding means.

11. A machine of the class described having rotatable means having a peripheral surface adapted to receive and transfer adhesive, plural means for feeding material on a line inwardly with respect to the rotative path of said surface, a pair of driven rolls arranged between said feeding means for holding the material against the adhesive applying surface and having their peripheries projecting across the line of feed, but spaced from said surface.

12. A machine of the class described including means for feeding one material, means for applying adhesive to the fed material, means for advancing the material after application of adhesive, means for feeding a second material and registering the same with the first, and grooved pressing means cooperating with the means for advancing the blank after application of adhesive, for obtaining an adhesive juncture of the material.

13. A device of the class described including means for feeding one material, means for applying adhesive to the fed material, means for feeding the second material and registering it with the first after application of adhesive, and an air blast for holding the material in contact with the second material feeding means as it approaches the point of registration.

14. A device of the class described including means for feeding one material, means for applying adhesive to the fed material, means for advancing the material after application of adhesive, means for feeding a second material toward the advancing means, and registering the same with the first material, means for severing the second material in predetermined lengths, and means for varying the area of contact of the second material with the feeding means before severance.

15. A device of the class described including means for feeding one material, means for applying adhesive to the fed material, said means including a drum having a plate circumferentially adjustable thereon, said plate having a plurality of openings, and an adhesive transfer element as one of a series of elements of different areas having openings adapted to register with the openings of the plate, and means detachably securing the element and plate by use of the openings.

16. A device of the class described including means for feeding one material, rotatable means for applying adhesive to the fed material, and rotatable means for holding the material in contact with the adhesive applying means, said means arranged so as not to be contactable by the adhesive applying means, and comprising a plurality of narrow contacting surfaces.

17. A device of the class described including means for feeding one material, means for applying adhesive to a predetermined portion of the fed material, means for advancing the material after application of adhesive, means for feeding a second material toward and registering the same with the adhesive of the first, means for severing the second material, and means for holding the second material by slipping contact with the secondary feeding means before and during severing, said advancing and secondary feeding means, after severing, cooperating to press the materials together to insure adhesive juncture.

18. A device of the class described including means for feeding one material, means for applying adhesive to a predetermined portion of the fed material, means for advancing the material after application of adhesive, means for feeding the second material toward the first and registering the same therewith, means for severing the second material, and an air blast for holding the second material in contact with the secondary feeding means.

19. A machine of the class described including means for feeding a first material, means for applying adhesive to the fed material, means for advancing the material after application of adhesive, secondary means for feeding a second material into register with the first, means for severing the second material, means for holding the second material in contact with the secondary feeding means while severing, said advancing and secondary feeding means being adapted to press the materials together after severance of the second material, said secondary means having grooves in its working surface.

20. A device of the class described including side frames, feed means adjacent one of the side frames and movable lengthwise thereof, means for feeding materials to said first feeding means, means for cutting said second material, said feeding and cutting means being arranged adjacent said frame and being supported by means arranged to give an unobstructed view, and accessibility to said means by an operator standing at said frame.

21. A machine for feeding and severing thin, pliable cellulosic material having in combination means for intermittently feeding a web of the cellulosic material, means for severing said web into sheets of predetermined length, said means timed with the mechanism for intermittently feeding the web so as to be actuated during the intermittent non-feeding periods of said web, impositive feeding means for said web effective for positive feeding thereof subsequent to a severing operation, said impositive feeding means effective for holding the web taut during the severing operation.

22. A machine for feeding and severing thin, pliable cellulosic material having in combination means for intermittently feeding a web of the cellulosic material, means for severing said web into sheets of predetermined length, said means timed with the mechanism for intermittently feeding the web so as to be actuated during the intermittent non-feeding periods of said web, continuously operative untimed impositive feeding means for said web effective for positive feeding thereof subsequent to a severing operation, said impositive feeding means effective for holding the web taut during the severing operation.

23. A machine for feeding and severing thin, pliable cellulosic material having in combination means for intermittently feeding a web of the cellulosic material, means for severing said web into sheets of predetermined length, said means timed with the mechanism for intermittently feeding the web so as to be actuated during the intermittent non-feeding periods of said web, impositive feeding means for said web effective for positive feeding thereof subsequent to a severing operation, said impositive feeding means effective for holding the web taut during the severing operation, a conveyor for feeding carton stock into position to receive a severed piece of the cellulosic material, and means for actuating said conveyor timed with the initial web feeding and severing means.

24. A machine for feeding and severing thin, pliable cellulosic material having in combination means for intermittently feeding a web of cellulosic material, means for severing said web, impositive untimed feeding means for holding said web taut prior to the severing thereof, said impositive feeding means effective for feeding severed pieces of said web, and means for conveying carton stock into position to receive a severed piece of the cellulosic material, said means timed with said initial web feeding and severing means.

25. A machine for feeding and severing thin, pliable cellulosic material having in combination means for intermittently feeding a web of the cellulosic material, means for severing said web into sheets of predetermined length, said means timed with the mechanism for intermittently feeding the web so as to be actuated during the intermittent non-feeding periods of said web, impositive feeding means for said web effective for positive feeding thereof subsequent to a severing operation, said impositive feeding means effective for holding the web taut during the severing operation, said impositive feeding means comprising a conveyor having a conveying surface movable in a curved plane conforming to the arc of a large circle with a series of relatively smaller rollers arranged in an arcuate formation conforming to the contour of the arc of said conveyor.

26. A machine for feeding and severing thin, pliable cellulosic material having in combination means for intermittently feeding a web of the cellulosic material, means for severing said web into sheets of predetermined length, said means timed with the mechanism for intermittently feeding the web so as to be actuated during the intermittent non-feeding periods of said web, impositive feeding means for said web effective for positive feeding thereof subsequent to a severing operation, said impositive feeding means effective for holding the web taut during the severing operation, said impositive feeding means comprising a conveyor having a conveying surface movable in a curved plane conforming to the arc of a large circle with a series of relatively smaller rollers arranged in an arcuate formation conforming to the contour of the arc of said conveyor, said smaller rollers provided with driving means frictionally engaging said large roller.

27. In a machine having means for feeding an article, means for feeding thin pliable material to be applied to the article, and means for severing said material into sheets of predetermined length, and feeding means for holding the thin material at a point beyond the severing means under continuous slipping tension before and during severing, and for thereafter advancing the severed material toward the article.

28. In a machine having means for feeding an article, means for feeding thin pliable material to be applied to the article, and means for severing said material into sheets of predetermined length, and feeding means including a continuously moving surface acting by slipping friction for holding the thin material under continuous tension before and during severing and for thereafter advancing the severed material toward the article.

29. In a machine for feeding and severing thin pliable cellulosic material, means for feeding a web of cellulosic material, means for severing the web into sheets of predetermined length, a continuously operative untimed impositive feeding means for a portion of the web which has passed the severing means adapted to hold said portion taut during the severing operation, and to smooth it, and including a continuously moving surface and rollers gravity moved toward said surface, said means being effective for positively feeding said portion subsequent to a severing operation.

30. In a machine having means for feeding thin pliable material and means for severing the same into sheets of predetermined length, and impositive feeding means effective to pull a length taut during severing and subsequently effective to positively feed the severed length.

31. In a machine for feeding and severing material, means for feeding a first material, means for applying adhesive thereto, feeding means impositively operative for smoothing and holding taut a second material while severing, and positively operative to feed the cut material into contact with the adhesive of the first material after severing, means for delivering the second material into feeding relation with said impositive feeding means, means for severing the second material while it is held tautly by and during impositive feeding of said impositive feeding means, and means operating the impositive feeding means at a greater speed rate than that of said second material before it is severed.

32. A machine for feeding and severing thin pliable cellulosic material having in combination means for intermittently feeding a web of the cellulosic material, means for severing said web into sheets of predetermined length, said means timed with the mechanism for intermittently feeding the web so as to be actuated during the intermittent non-feeding periods of said web, a continuously operative untimed impositive feeding means operative on a portion of said web which has passed the severing means, and effective for positive feeding of said web following a severing operation, said impositive feeding means being effective for holding the web taut during the severing operation, and including a continuously moving surface in feeding relation with the forward portion of the cellulosic material.

33. In a machine of the class described, first means for feeding a first material, second means for feeding a second thin pliable cellulosic material for contact with the first material, means for severing the second material into lengths after passing through the second feeding means, impositive feeding means acting forwardly of the severing means for maintaining a taut condition of the second material while being severed, said last mentioned feeding means acting after severing to positively feed the severed material into contact with the first material.

34. In an adhesive applying mechanism, a rotative drum, a plate and means by which it is circumferentially adjustable on the drum, an adhesive transfer plate, and means by which the transfer plate can be attached in any one of a plurality of locations on the circumferentially adjustable plate.

35. In an adhesive applying mechanism, a rotative drum, a plate and means by which it is circumferentially adjustable on the drum, means for securing it in adjusted position, said plate having a relatively large number of openings in its curved surface in regularly spaced relation and over a relatively large area, a transfer plate having openings spaced to register with a certain number of openings of the plate, when placed in any one of a plurality of positions on the plate, and means cooperative with the openings to detachably secure the plate to the drum.

36. An adhesive applying mechanism, including a rotatable adhesive transferring means, means for feeding material, means adapted to receive the material from the feeding means and to hold it in contact with the adhesive transferring means, including a roll having a plurality of substantially V-shaped peripheries of small surface area adjacent but so spaced as not to contact the adhesive transferring means in the absence of the material.

37. In a machine having means for feeding a first material, means for applying adhesive to the first material while it is fed, feeding means for a second material, severing means for the second material, impositive feeding means acting on the second material forwardly of the severing means during severing, and after severing acting to positively feed the severed material, and means by which said feeding means for the first material and the impositive feeding means for the second material are operated in timed relationship so that the second material is accurately contacted with the adhesive of the first material.

38. In a machine having means including a pair of feed rolls for positively feeding thin pliable material, means for severing the same into sheets of predetermined length after it emerges from said feed rolls, and slipping friction means acting on the forward free portion of the length to be severed to take up slack before severing, and thereafter to advance the severed length directly into contact with a second material and to press such length by rolling contact progressively from end to end of said length against the second material.

39. In a machine having means including a pair of feed rolls for positively feeding thin pliable material, means for severing the same into sheets of predetermined length after it emerges from said feed rolls, and slipping friction means acting on the forward free portion of the length to be severed to take up slack before severing, and thereafter to advance the severed length directly into contact with a moving second material and to press such length by rolling contact progressively from end to end of said length against the second material, said slipping friction means presenting a continuously moving endless surface advancing at a speed exactly matching the speed of said second material and against which moving surface the first material is held in light frictional contact, the drag of said moving surface on said length of material which is still unsevered serving to stretch it taut and the continued drag of said moving surface after severance serving to carry the severed length along with it and directly onto the second material.

40. In a machine having means for feeding thin pliable material, means for severing the same into sheets of predetermined length, and means acting on the forward portion of the length to be severed to take up slack before severing, and thereafter to advance the severed length, including guiding means acting to smooth and maintain a smooth flat condition of the severed length as it advances.

41. A device of the class described including plural feeding means adapted to feed material delivered therebetween, means for delivering material between said feeding means, and means for holding the fed material against the working surface of one of said feeding means and for varying the area of contact of the fed material with that surface.

42. A device of the class described including plural feeding means cooperable to perform a feeding operation, one of said means having a series of grooves in its working face extending in direction of its feeding motion, means for feeding material toward the grooved feeding means adjacent the meeting point of the plural feeding means, and means for directing an air blast to maintain contact between the material and the grooved feeding means.

43. An adhesive applying mechanism, a drum having an adhesive transferring means, means for applying adhesive to said transferring means as the drum rotates, means for successively feeding separate strips of material, means adapted to receive each separate strip of material from the feeding means to hold it in contact with said transfer means including a driven roll having its rotative axis substantially parallel with the rotative axis of the drum, said roll composed of a plurality of spaced concentric feeding surfaces, each having a feeding periphery of substantially small surface area moving in direction of feed and spaced so as not to contact said adhesive transfer means when a separate strip is not being fed, whereby in case of deposit of adhesive on the peripheries of said disks, the amount of such deposit is so small that drying will take place before the glue can be transferred to the wrong side of the material, or to that side which engages said feeding surfaces.

44. A device of the class described, including means for feeding a first material, means for applying adhesive to the fed material, a continuously moving surface, means for intermittently feeding a second material to the continuously moving surface and causing it to register with the adhesive on the first material, said first material feeding means and said continuously moving surface being adapted to cooperate to press the two materials together to assure adhesive juncture.

EDWIN G. STAUDE.